(12) United States Patent
Son

(10) Patent No.: US 7,316,106 B2
(45) Date of Patent: Jan. 8, 2008

(54) METHOD FOR PROCESSING COMBUSTION EXHAUST GAS CONTAINING SOOT PARTICLES AND NOX

(75) Inventor: Geon-Seog Son, Seongnam-Si (KR)

(73) Assignee: GM Daewoo Auto & Technology Company, Incheon (KR)

( * ) Notice: Subject to any disclaimer, the term of this patent is extended or adjusted under 35 U.S.C. 154(b) by 0 days.

(21) Appl. No.: 11/213,213

(22) Filed: Aug. 26, 2005

(65) Prior Publication Data

US 2005/0284137 A1    Dec. 29, 2005

Related U.S. Application Data

(63) Continuation-in-part of application No. 11/120,558, filed on May 3, 2005, which is a continuation-in-part of application No. 11/120,559, filed on May 3, 2005, which is a continuation of application No. PCT/KR05/00296, filed on Feb. 1, 2005.

(30) Foreign Application Priority Data

| Sep. 7, 2004 | (KR) | .................. | 10-2004-0071277 |
| May 7, 2005 | (KR) | .................. | 10-2005-0038199 |

(51) Int. Cl.
*F01N 3/00* (2006.01)

(52) U.S. Cl. .................. 60/295; 60/274; 60/275; 60/297; 60/301; 422/169; 422/174; 422/186.04; 422/186.1; 422/186.3

(58) Field of Classification Search .................. 60/274, 60/275, 295, 297, 301, 311; 422/169, 174, 422/186.03, 186.04, 186.1, 186.15, 186.3
See application file for complete search history.

(56) References Cited

U.S. PATENT DOCUMENTS 4,902,487 A    2/1990    Cooper et al.

| 6,038,854 | A  | * | 3/2000  | Penetrante et al. | ........... 60/297  |
| 6,475,350 | B2 | * | 11/2002 | Palekar et al.    | ............. 204/164 |
| 6,557,340 | B1 | * | 5/2003  | Twigg et al.      | .................. 60/275 |
| 6,820,414 | B2 | * | 11/2004 | Stroia et al.     | .................. 60/286 |
| 6,936,232 | B2 | * | 8/2005  | Gillespie et al.  | ......... 423/239.2 |
| 6,955,041 | B2 | * | 10/2005 | Takeshima et al.  | ........... 60/275 |

FOREIGN PATENT DOCUMENTS

| EP | 0341832 A2  | 11/1989 |
| JP | 06-159037   | 6/1994  |
| JP | 2002-020284 | 1/2002  |
| JP | 2004-120020 | 4/2004  |
| JP | 2004-197703 | 7/2004  |
| WO | WO 0070202  | 11/2000 |

\* cited by examiner

*Primary Examiner*—Binh Q. Tran
(74) *Attorney, Agent, or Firm*—Schweitzer Cornman Gross & Bondell LLP

(57) ABSTRACT

The invention relates to a system and a method for processing exhaust gas of an internal combustion engine such as a diesel engine. The disclosed system and method can be particularly suitable to the diesel engine that usually operates in a lean burn condition without the occurrence of a periodic high-load condition in view of its combustion characteristics. According to the system and method, an exhaust composition containing soot particles and gaseous components are processed to remove the soot particles and to reduce the amount of NOx compounds. The soot particles are first filtered with a filter that passes gaseous components of the composition and collecting the soot particles. The collected soot particles are oxidized in the presence of a light-activated redox catalyst to turn to smaller molecules that can pass through the filter. The NOx compounds are temporarily adsorbed by an adsorber and reduced in the presence of a light-activated redox catalyst to turn to $N_2$.

16 Claims, 5 Drawing Sheets

(a)　　　　　　　　　　　(b)

though platinum (Pt) susceptible to the poisoning due to sulfur existing abundantly in diesel exhaust gas is used as an oxidizing agent for causing NO to be oxidized into NO2.
METHOD FOR PROCESSING COMBUSTION EXHAUST GAS CONTAINING SOOT PARTICLES AND NOX

CROSS-REFERENCE TO RELATED APPLICATIONS

This application is a continuation-in-part U.S. patent application Ser. Nos. 11/120,558 and 11/120,559, both filed on May 3, 2005, which are continuations of International Patent Application No. PCT/KR2005/000296, filed Feb. 1, 2005 and designating the United States. The foregoing U.S. and international applications are hereby incorporated herein by reference. This application also claims for the benefit of the earlier foreign filing dates under 35 U.S.C. § 119(a) of Korean Patent Application Nos. 10-2004-0071277, filed Sep. 7, 2004 and 10-2005-0038199, filed May 7, 2005, which are hereby incorporated herein by reference. Further, this application is related to U.S. patent application Ser. No. 11/213,167, filed concurrently herewith and entitled "System for Processing Combustion Exhaust Gas Containing Soot Particles and NOx.," which is hereby incorporated by reference herein.

BACKGROUND OF THE INVENTION

1. Field of Invention

The present invention relates to system and method for processing combustion exhaust gas containing soot particles and NOx.

2. Description of Related Technology

Exhaust gas emitted from a diesel engine includes air pollutants, such as carbon monoxide (CO), unburned hydrocarbon (HC), nitrogen oxide (NOx), particulate matters containing soluble organic fractions (SOF), and the like. The permissible amount of exhaust gas emitted from a diesel engine is generally regulated by law and often determined by means of the management and design of engine and the post processing of exhaust gas.

In a general diesel engine, HC and CO are purified to a predetermined level by means of Pt-based diesel oxidation catalyst (DOC), NOx emission is controlled by means of an exhaust gas recirculation (EGR) system of a diesel engine, and particulate matters (PM) are collected by means of a diesel particulate filter (DPF) such that the amount of particulate matters to be discharged will be controlled within a predetermined range. However, such a technique is performed by causing particulate matters collected in the diesel particulate filter to be burnt at a high temperature using an additional device such as heater or burner or by causing the particulate matters to be oxidized using catalyst coated on an inner surface of the diesel particulate filter to regenerate the filter. Therefore, its utility is greatly reduced.

As another technology, the Johnson Matthey company has proposed such a technique that a diesel particulate filter is regenerated by causing NO in exhaust gas to be oxidized into NO2 having superior oxidation activity upstream of the diesel particulate filter and causing particulate matters collected in the diesel particulate filter to be oxidized using the oxidized NO2 as an oxidizing agent. Such a technique is disclosed in EP-A-0341832 and U.S. Pat. No. 4,902,487 and is well known in the art as a trademark CRT™.

According to the aforementioned technique, however, platinum (Pt) susceptible to the poisoning due to sulfur existing abundantly in diesel exhaust gas is used as an oxidizing agent for causing NO to be oxidized into NO2. Therefore, there is a limitation in that only fuel such as ultra low sulfur diesel (ULSD) should be used. Further, since about 3 to 8% of NOx can be simply reduced from the exhaust gas, there is a need for an additional technique for reducing nitrogen oxide.

In this connection, the Johnson Matthey Company has developed a four-way post-processing system called a SCRT™ system in which selective catalytic reduction (SCR) catalyst is applied to a diesel particulate filter. This system is known as a system capable of reducing particulate matters and nitrogen oxide by about 75 to 90% as well as removing HC and CO. However, this system requires post-processed volume of the exhaust gas 13.6 times as large as the engine displacement. Therefore, it is tentatively applied to a large diesel engine but came to light that its utility is greatly lowered. Further, the poisoning problem due to sulfur still remains.

Furthermore, Toyota Motor Corporation has developed a diesel particulate NOx reduction (DPNR) system by which both particulate matters and nitrogen oxide can be reduced by causing NOx adsorber catalyst to be coated onto a general diesel particulate filter (DPF) and platinum oxidation catalyst to be placed onto the diesel particulate filter. This system is disclosed in Japanese Patent Laid-Open Publication No. (Hei) 6-159037 and the like.

The DPNR technique will be described with reference to FIG. 1. In FIG. 1(a) showing a lean burn condition of a diesel engine, O2 and NO react with each other near oxidation catalyst, i.e. Pt, and active oxygen O* and NO2 are produced. Further, NO2 exists in adsorber catalyst in the form of its salt. Then, particulate matters (PM) are oxidized by means of O* so produced and O2 in the exhaust gas, and the oxidized PM again reacts with O2 in the exhaust gas to be oxidized into CO2.

In addition, in FIG. 1(b) showing a rich burn condition of a diesel engine, NOx, which has been adsorbed to the adsorber catalyst in the form of its salt by means of hot temperature and instantaneous rich exhaust conditions, is converted into NO and O* which in turn are discharged. Further, the discharged NO and O* react with HC and CO through oxidation catalytic reaction and are converted into CO2, H2O and N2. Furthermore, even under the rich burn condition where there is shortage of oxygen, the particulate matters (PM) reacts with O* emitted from the adsorber catalyst such that it can be oxidized into CO2.

However, the DPNR system of Toyota Motor Corporation, in which a continuous regeneration approach is employed, still has the following technical limitations. First, since platinum is used as oxidation catalyst, reduction in performance resulting from the poisoning due to sulfur existing abundantly in diesel exhaust gas cannot be avoided. Second, since the adsorbed nitrogen oxide can be purified only if a rich burn condition should be periodically provided, high fuel efficiency that is one of most significant advantages of a diesel engine is lowered. Further, there are problems in that costs are increased because an additional fuel injection system should be installed to an upper end of the DPNR system in order to provide a periodic rich burn condition, and that a stable operation cannot be performed because the post injection should be made in the fuel injection system of the diesel engine.

In addition, since there is a limit to the amount of NOx adsorbed by the adsorber catalyst under the lean burn condition of a diesel engine, the diesel engine needs to be periodically operated under a rich burn condition or at a stoichiometric air-fuel ratio where there is shortage of oxygen. This means that the aforementioned conventional technique is not suitable for a diesel car engine that usually operates in a lean burn condition without the occurrence of a periodic high-load condition in view of its combustion characteristics.

Furthermore, the conventional technique has the following problems. That is, high activation temperature and resultant high energy are required to allow platinum constituting the oxidation catalyst to have sufficient oxidizing power, and the platinum oxidation catalyst cannot provide any functions of purifying the exhaust gas until it reaches the activation temperature.

Moreover, according to the conventional technique, since HC and CO are rapidly oxidized by means of the platinum oxidation catalyst under the rich burn condition where NOx adsorber catalyst can be regenerated, the reduction of NOx can be prevented. To avoid this, the conventional technique adopts the post injection method in which greater amount of fuel is injected in consideration of the amount of HC and CO under the rich burn condition. However, this results in waste of diesel fuel.

SUMMARY OF CERTAIN INVENTIVE ASPECTS

An aspect of the invention provide a system for processing a composition comprising soot particles and NOx. The system comprises an inlet configured to receive a composition comprising soot particles and gaseous components, the gaseous components comprising NOx compounds, which comprise NO and $NO_2$; an outlet configured to discharge a processed composition; a soot remover located between the inlet and outlet, the soot remover comprising a filter, a first light-activated redox catalyst and a first light source, the filter being configured to filter soot particles while passing most of the gaseous components therethrough, the soot particles comprising hydrocarbons that may not pass the filter, the first light source being configured to generate light so as to activate the first light-activated redox catalyst, wherein at least part of the filtered soot particles is removed by an oxidation reaction thereof in the presence of the first redox catalyst, and wherein some or all of the hydrocarbons are broken into smaller molecules that can pass through the filter; and a NOx converter located between the inlet and outlet, the NOx converter comprising an adsorber, a second light-activated redox catalyst and a second light source, the adsorber being configured to adsorb at least part of the NOx compounds, the second light source being configured to generate light so as to activate the second light-activated redox catalyst, wherein at least part of the NOx compounds is adsorbed in the adsorber and converted to $N_2$ by a reduction reaction thereof in the presence of the second redox catalyst.

In the foregoing system, the filter may be made of a porous ceramic material. At least one of the first and second light-activated redox catalysts may be selected from the group consisting of $TiO_2$, ZnO, CdS, $ZrO_2$, $SnO_2$, $V_2O_2$, $WO_3$, $SrTiO_3$, and a mixture comprising one or more of the foregoing compounds. At least one of the first and second light sources may comprise a plasma generator comprising two discharge electrodes configured to create a plasma discharge state upon application of a voltage therebetween. The system may further comprise a controller configured to change intensity of the light generated by at least one of the first and second light sources, and wherein the degree of at least one of the removal of soot particles and the conversion of NOx may be attributable to the change of the intensity of the light. At least part of the smaller molecules broken from hydrocarbons may participate in the reduction reaction of NOx compounds as a reducing agent. The system may further comprise a control circuit configured to control intensity of the light generated by at least one of the first and second light sources. At least part of the NOx compounds may participate in the oxidation reaction of hydrocarbons as an oxidizing agent. The system may further comprise a pre-oxidizer located between the inlet and the soot remover, wherein the pre-oxidizer may be configured to oxidize at least part of components of the composition passing therethrough.

Another aspect of the invention provides a system for processing a combustion exhaust composition. The system comprises: an inlet configured to receive a composition comprising soot particles and gaseous components, the gaseous components comprising NOx compounds; an outlet configured to discharge a processed composition; a soot remover located between the inlet and outlet, the soot remover comprising a filter configured to filter soot particles while passing most of the gaseous components, the soot remover being configured to provide an oxidizing agent to the filtered soot particles such that at least part of the filtered soot particles is oxidized and broken into smaller molecules that can pass through the filter; and a NOx converter located between the soot converter and outlet, the NOx converter comprising an adsorber configured to adsorb at least part of the NOx, the NOx converter being configured to provide a reducing agent to the adsorbed NOx such that at least part of the adsorbed NOx is reduced and converted to $N_2$.

The foregoing system may further comprise a pre-oxidizer located between the inlet and the soot remover, wherein the pre-oxidizer may be configured to oxidize at least part of components of the composition, thereby converting the at least part of the components to oxidized species thereof. The pre-oxidizer may comprise a light-activated redox catalyst and a light source configured to generate light for activating the light-activated redox catalyst. The pre-oxidizer may comprise a plurality of channels elongated in a general direction from the inlet toward the soot remover, and wherein the redox catalyst may be provide in at least one of the channels. The oxidizing agent provided to the filtered soot particles may comprise at least part of the oxidized species converted in the pre-oxidizer. At least one of the soot remover and the NOx converter may further comprise a light-activated redox catalyst and a light source configured to generate light for activating the light-activated redox catalyst. The soot remover may comprise a first cell having an opening toward the inlet and a second cell having an opening toward the NOx converter, wherein the filter may be located between and separates the first and second cell. The soot remover may further comprise a plasma-activated redox catalyst and a pair of discharge electrodes configured to create a plasma discharge in the vicinity of the filter. The reducing agent provided to the adsorbed NOx may comprise at least part of the small molecules broken from soot particles. The NOx converter may comprise a plurality of channels elongated in a general direction from the soot remover toward the outlet, and wherein a redox catalyst may be provided in at least part of the channels. The system may further comprise an automobile comprising an internal combustion engine, wherein the inlet may be connected to an exhaust of the internal combustion engine of the automobile.

Another aspect of the invention provides a system for processing exhaust gas of an engine. The system comprises: a first reactor configured to oxidize at least part of HC, CO, NO and particulate matters contained in an exhaust gas; a second reactor configured to collect the particulate matters with a filter and oxidizing the collected particulate matters; a third reactor comprising a light source, a light-activated redox catalyst and an adsorber configured to adsorb NOx contained in the exhaust gas, the third reactor being configured to remove at least part of the adsorbed NOx by a reduction reaction thereof; and a controller for controlling intensity of light from the light source. The first, second and third reactors are located in a conduit for flowing exhaust gas of an engine.

Still another aspect of the invention provides a method of processing a composition comprising soot particles and NOx. The method may comprise: flowing a composition comprising soot particles and gaseous components through a conduit in a flow direction, the gaseous components comprising NOx compounds, which comprise NO and $NO_2$; filtering the soot particles with a filter located in the conduit while passing most of the gaseous components through the filter, the soot particles comprising hydrocarbons that may not pass through the filter; removing at least part of the filtered soot particles from the filter by an oxidation reaction of some or all of the hydrocarbons, which are broken into smaller molecules that can pass through the filter; adsorbing at least part of the NOx compounds with an adsorber located in the conduit; and converting at least part of the adsorbed NOx compounds to $N_2$ by a reduction reaction of NOx compounds.

In the foregoing method, the adsorber may be located in the conduit past the filter in the flow direction. At least part of the smaller molecules passing through the filter may participate in the reduction reaction of NOx compounds as a reducing agent. At least one of the oxidation and reduction reactions may be conducted in the presence of a redox catalyst. The catalyst may be selected from the group consisting of $TiO_2$, ZnO, CdS, $ZrO_2$, $SnO_2$, $V_2O_2$, $WO_3$, $SrTiO_3$, and a mixture comprising one or more of the foregoing compounds. The redox catalyst may be provided in the vicinity of at least one of the filter and the adsorber. The redox catalyst may comprise a photocatalyst that can be activated by applying light thereto, and wherein the method may further comprise applying light to the photocatalyst so as to activate the redox catalyst. Applying light may comprise providing creating plasma discharge in the vicinity of the photocatalyst. A degree of activation of the photocatalyst may be controllable by intensity of the light applied thereto, and wherein the method may further comprise changing the intensity of the light, thereby controlling the degree of activation of the redox catalyst. At least part of the smaller molecules passing through the filter may participate in the reduction reaction NOx as a reducing agent. The method may further comprise increasing the intensity of the light applied to the photocatalyst for the oxidation reaction of hydrocarbons so as to supply more reducing agents for the reduction reaction of NOx compounds. At least part of the NOx compounds participate in the oxidation reaction of hydrocarbons as an oxidizing agent.

The method may further comprise subjecting the composition to oxidation conditions in an area in the conduit before the filter in the flow direction, wherein at least part of components of the composition may be oxidized in the oxidation conditions before reaching the filter. At least part of the NOx compounds are oxidized to $NO_2$ by the oxidation conditions, and wherein $NO_2$ may participate in the oxidation reaction of hydrocarbons as an oxidizing agent. The oxidation conditions are provided by activating a redox catalyst provided in the area by applying light thereto, and wherein the method may further comprise changing the intensity of the light, thereby controlling a degree of activation of the redox catalyst and controlling the oxidation of components of the composition while passing through the area. At least part of the oxidized components in the oxidation conditions may participate in the oxidation reaction of hydrocarbons as an oxidizing agent, and wherein the method may further comprise increasing the intensity of the light applied to the photocatalyst so as to supply more oxidizing agents for the oxidation reaction of hydrocarbons. The filter may be made of a porous ceramic material. The composition may comprise an exhaust gas from combustion of fuel comprising hydrocarbons. The method does not supply an oxidizing agent or a reducing agent other than the exhaust gas and air from the surrounding. Flowing, filtering, removing, adsorbing and converting are substantially continuously carried out in a single apparatus comprising the conduit.

A further aspect of the invention provides a method for purifying exhaust gas of an engine. The method comprises: oxidizing at least part of hydrocarbons, CO, NO and particulate matters contained in the exhaust gas by an oxidation reaction in the presence of a light-activated redox catalyst in a first reactor; collecting with a filter the particulate matters of the exhaust gas after the first reactor, and oxidizing at least part of the collected particulate matters by an oxidation reaction in the presence of a light-activated redox catalyst in a second reactor; and adsorbing with an adsorber NOx contained in the exhaust gas after the second reactor and removing at least part of the adsorbed NOx by a reduction reaction in the presence of a light-activated redox catalyst in a third reactor, controlling the activity of at least one of the light-activated redox catalysts in the first, second and third reactors by adjusting intensity of light applied to the light-activated redox catalyst in the at least one of the reactors.

A further aspect of the invention provides a system and method for purifying or processing exhaust gas or soot of a diesel engine, which is particularly suitable to a diesel car engine that usually operates in a lean burn condition without the occurrence of a periodic high-load condition in view of its combustion characteristics. A still further aspect of the invention provides a system and method for purifying exhaust gas, by which fuel consumption can be reduced by solving the problems of the related art in which additional fuel has been further injected to create an atmosphere where NOx can be reduced. A still further aspect of the invention provides a system and method for purifying exhaust gas of a diesel engine, by which harmful materials such as HC, CO, PM and NOx can be purified at a relatively low temperature, and exhaust gas purification efficiency can be enhanced due to the structure that does not require the time needed for activating the catalyst. A still further aspect of the invention provides a system and method for purifying exhaust gas of a diesel engine, by which efficiency of purifying exhaust gas can be improved and waste of energy needed in purifying the exhaust gas can also be reduced by controlling components, such as HC, CO, C or $NO_2$, in the exhaust gas as oxidizing or reducing agents for stepwise oxidation or reduction.

According to an aspect of the invention, there is provided a system for purifying exhaust gas of a diesel engine, which comprises a first reactor for at least partially oxidizing HC or particulate matters in the exhaust gas; a second reactor for collecting the particulate matters in the exhaust gas passed through the first reactor onto a diesel particulate filter provided therein and then oxidizing the collected particulate matters to regenerate the diesel particulate filter; a third reactor which includes a light source, photocatalyst responsive thereto and adsorber, thereby adsorbing NOx in the exhaust gas passed through the second reactor with the adsorber and removing NOx through reduction reaction using a gaseous reducing agent generated by oxidizing the particulate matters collected in the second reactor; and a controller for controlling intensity of light from the light source according to concentration of the exhaust gas. According to the present invention, therefore, NOx removal efficiency can be improved by oxidizing at least a part of the particulate matters collected on the second reactor into gaseous ones using a light source in the third reactor such that the third reactor is in an atmosphere state where NOx can be reduced. Further, the fuel consumption can be greatly reduced since NOx can be sufficiently removed without additional supply of the fuel. Herein, a concentration of the exhaust gas means including the concentration of respective components in the exhaust gas as well as the concentration of oxygen in the exhaust gas.

Here, it is preferred that the first reactor include a light source of which light intensity can be adjusted by the controller, and photocatalyst responsive to the light source, thereby at least partially oxidizing HC or particulate matters through photocatalytic oxidation reaction.

Further, it is preferred that the second reactor include a light source of which light intensity can be adjusted by the controller, and photocatalyst responsive to the light source, thereby oxidizing the particulate matters collected on the diesel particulate filter through the photocatalytic oxidation reaction to regenerate the diesel particulate filter.

Preferably, the first reactor causes a part of HC, CO or particulate matters to be oxidized into $CO_2$ and NO to be oxidized into $NO_2$, the second reactor uses $NO_2$ in the exhaust gas passed through the first reactor as an oxidizing agent for oxidation of the particulate matters, and the third reactor uses at least one of the gaseous HC and CO and the solid C, which have been partially oxidized in the second reactor, as a reducing agent for reduction of NOx.

Further, it is preferred that the first, second and third reactors be consecutively installed within a casing having exhaust gas inlet and outlet and that the light source be a low temperature plasma unit for irradiating low temperature plasma onto the photocatalyst.

More preferably, the low temperature plasma unit includes a rod-shaped ground electrode, a mesh-type discharge electrode for covering an exhaust gas passage in each reactor, and a ceramic insulation for supporting the discharge electrode in the reactor. In addition, the photocatalyst is preferably $TiO_2$. Alternatively, the filter in the second reactor is alternately plugged with conductive metal at its intake inlets and exhausts outlets, and said metal function as electrodes.

According to another aspect of the present invention, there is provided a method for purifying exhaust gas of a diesel engine, comprising the steps of (a) at least partially oxidizing HC, CO, NO or particulate matters in the exhaust gas; (b) regenerating a diesel particulate filter by collecting the particulate matters in the exhaust gas passed through step (a) onto the diesel particulate filter and then oxidizing the collected particulate matters using $NO_2$ obtained through oxidation of NO as a reducing agent; and (c) adsorbing NOx in the exhaust gas passed through step (b) with adsorber and regenerating the adsorber through the NOx reduction by causing at least one of HC, CO and C obtained in step (b) to be used in the NOx reduction reaction.

At this time, it is preferred that the NOx reduction reaction be controlled in step (c) by controlling intensity of light causing photocatalytic reaction, that an amount of NOx to be used as an oxidizing agent in step (b) be adjusted in step (a) by controlling intensity of light causing photocatalytic reaction, and that an amount of HC, CO and C to be used as a-reducing agent in step (c) can be adjusted in step (b) by controlling intensity of light causing photocatalytic reaction.

Preferably, a low temperature plasma unit for irradiating low temperature plasma onto photocatalyst is used as a light source causing the photocatalytic reaction.

According to a further aspect of the present invention, there is provided a method for purifying exhaust gas of a diesel engine, comprising the steps of at least partially oxidizing HC, CO, NO or particulate matters in the exhaust gas through photocatalytic oxidation reaction using a light source, in a first reactor; collecting the particulate matters in the exhaust gas passed through the first reactor onto a diesel particulate filter and then oxidizing the collected particulate matters through photocatalytic oxidation reaction using a light source, in a second reactor; and adsorbing NOx in the exhaust gas passed through the second reactor with adsorber and removing NOx through photocatalytic reduction reaction using a light source, wherein an amount of $NO_2$ to be generated as an oxidizing agent in the second reactor, an amount of HC and CO to be generated as a reducing agent in the third reactor and an amount of NOx to be reduced in the third reactor are adjusted by controlling the light sources of the respective reactors.

BRIEF DESCRIPTION OF THE DRAWINGS

The above and other features and advantages of the present invention will become apparent from the following description of a preferred embodiment given in conjunction with the accompanying drawings, in which.

DETAILED DESCRIPTION OF EMBODIMENTS

Hereinafter, embodiments of the present invention will be described in detail with reference to the accompanying drawings.

Figure 1:
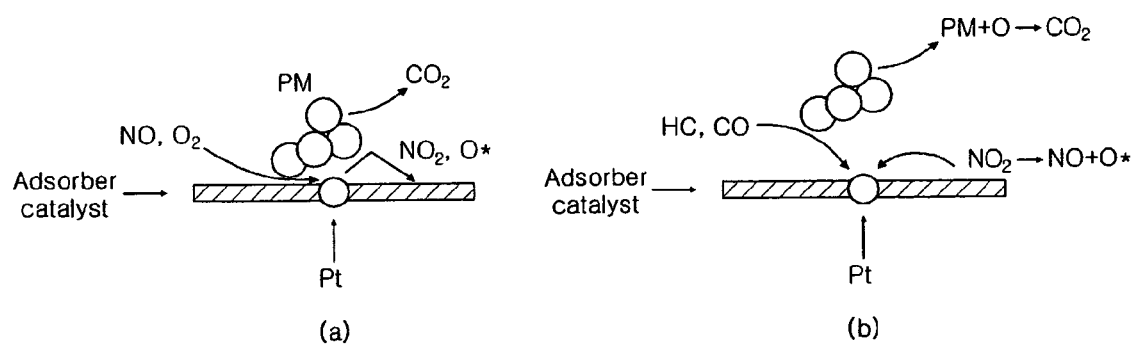
FIG. 1 is a view illustrating an operating principle of a system for purifying exhaust gas of a diesel engine.
Figure 2:
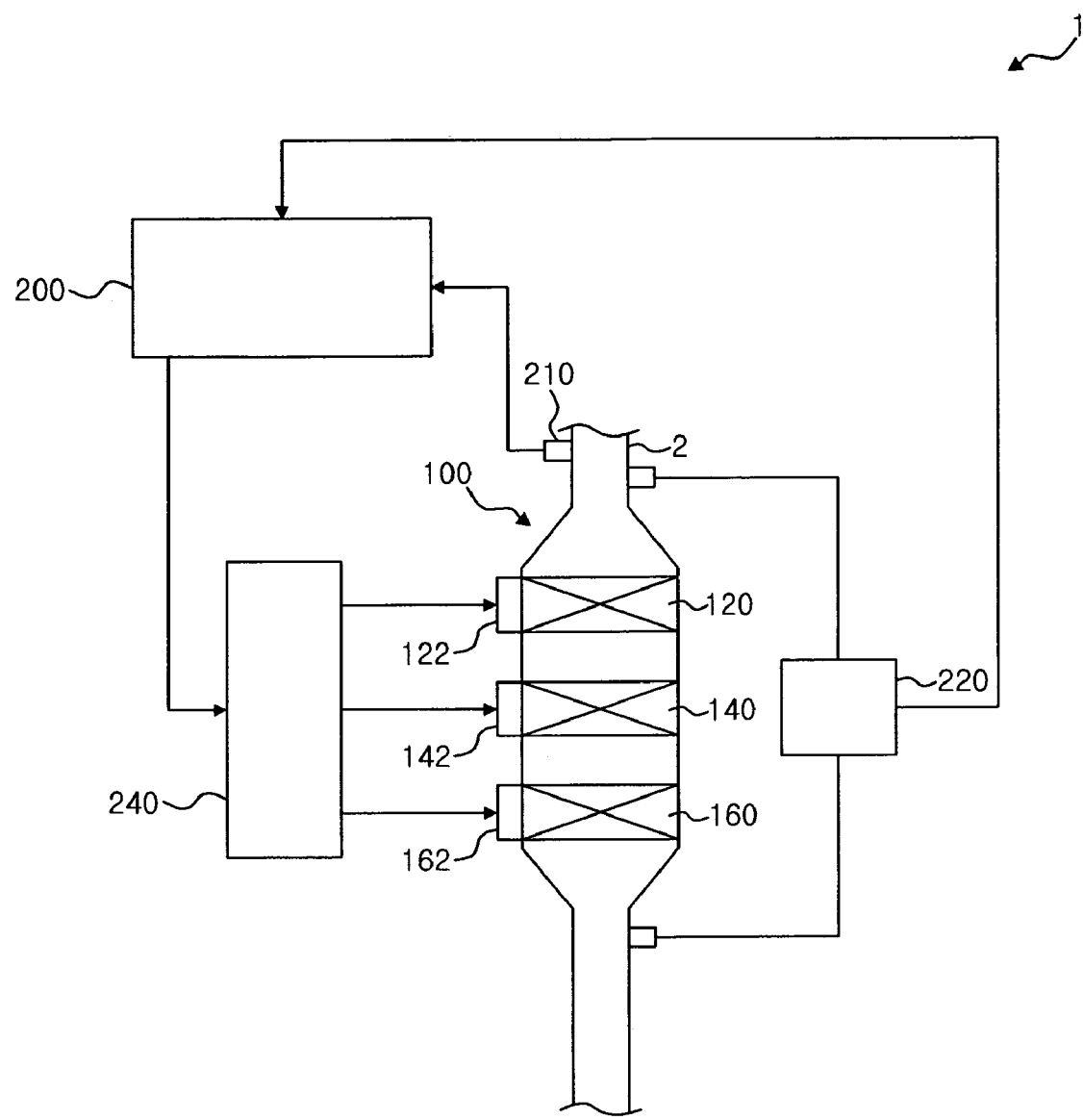
FIG. 2 is a view schematically showing the configuration of a system for purifying exhaust gas of a diesel engine according to an embodiment of the invention.

As shown in FIG. 2, a system 100 for purifying exhaust gas according to an embodiment of the present invention comprises first, second and third reactors 120, 140 and 160 that are successively installed to an exhaust pipe 2 of a diesel engine to successively purify pollutants from the exhaust gas. The reactors 120, 140 and 160 are formed into a single purifier 100 for successively purifying or processing hydrocarbons (HC), CO, PM, NOx and the like from the exhaust gas, as explained later. In certain embodiments, the reactors are a carrier or honeycomb monolith containing catalyst, or a filter according to their functions. Further, each reactor or at least one reactor may contain a plasma producing apparatus.

Each of the reactors 120, 140 and 160 contains TiO2 photocatalyst that can be activated by light emitted from a light source, for example, low temperature plasma light created by each of low temperature plasma units 122, 142 and 162. The degree of the photocatalytic reaction varies according to the intensity of light applied to the photocatalysts. In one embodiment, each of the low temperature plasma units is controlled by a controller 200 according to oxygen concentration (or dilution concentration) of the exhaust gas and the like.

In certain embodiments, an oxygen sensor 210 for measuring oxygen concentration of the exhaust gas may be provided upstream of the purifier 100. The controller 200 determines whether a diesel engine operates in a lean or rich burn condition, for example, based on an oxygen concentration measured by the oxygen sensor 210. Based on the determination, the controller 200 may wholly or individually control the photocatalytic reactions of the reactors 120, 140 and 160 by adjusting the electric power applied to the plasma units by the power source 240 of the low temperature plasma units 122, 142 and 162. Further, a differential pressure sensor 220 for measuring the pressure difference between the upstream and downstream of the purifier may be provided such that the controller 200 can also control the supply of electric power to the aforementioned low temperature plasma units 122, 142 and 162 depending upon the differential pressure of the exhaust gas measured by the differential pressure sensor 220.

Figure 3:
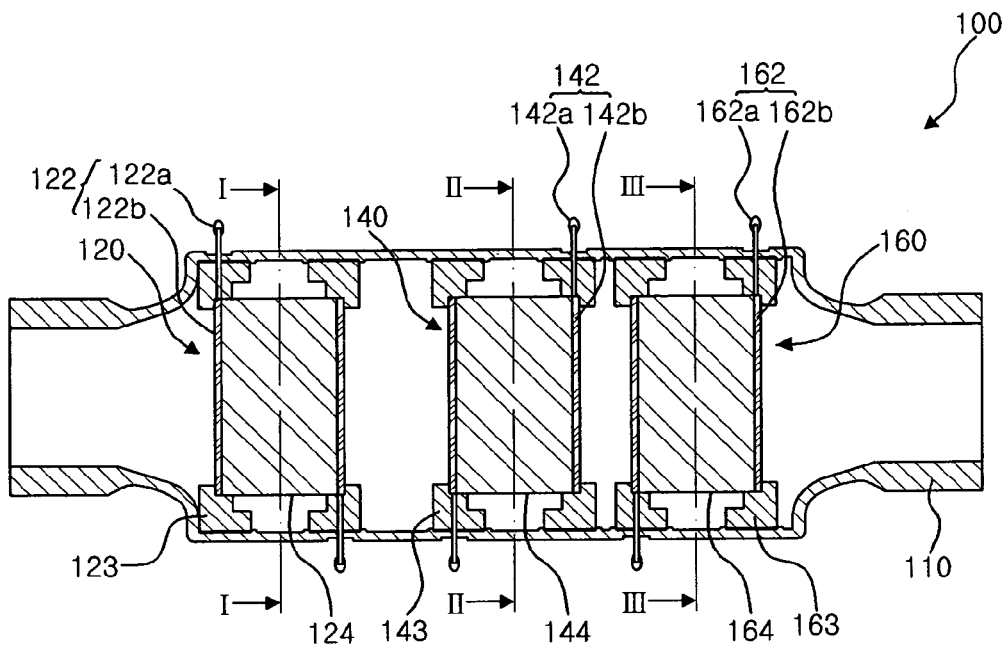
FIG. 3 is a sectional view showing a purifier constituting a main part of the exhaust gas purification system shown in FIG. 2.
Figure 4:
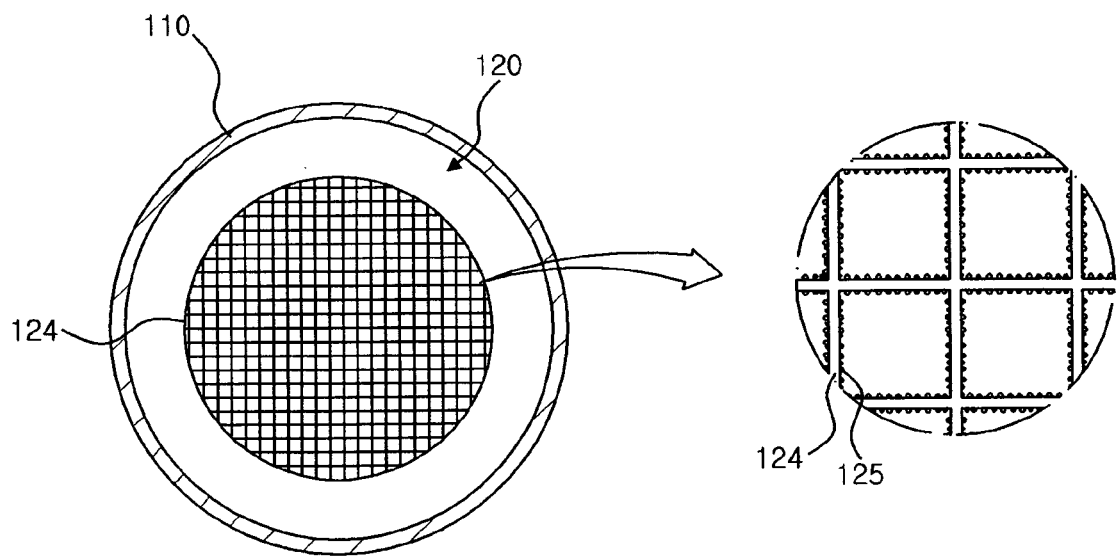
FIG. 4 is a sectional view taken along line I-I of FIG. 3 for explaining a first reactor of the exhaust gas purification system.
Figure 5:
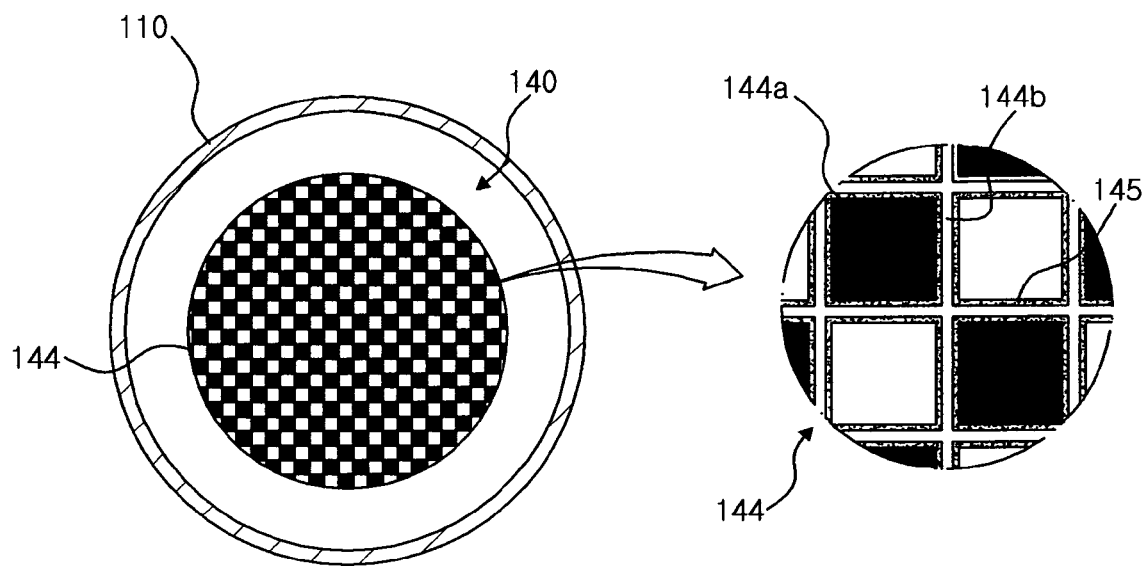
FIG. 5 a sectional view taken along line II-II of FIG. 3 for explaining a second reactor of the exhaust gas purification system.
Figure 6:
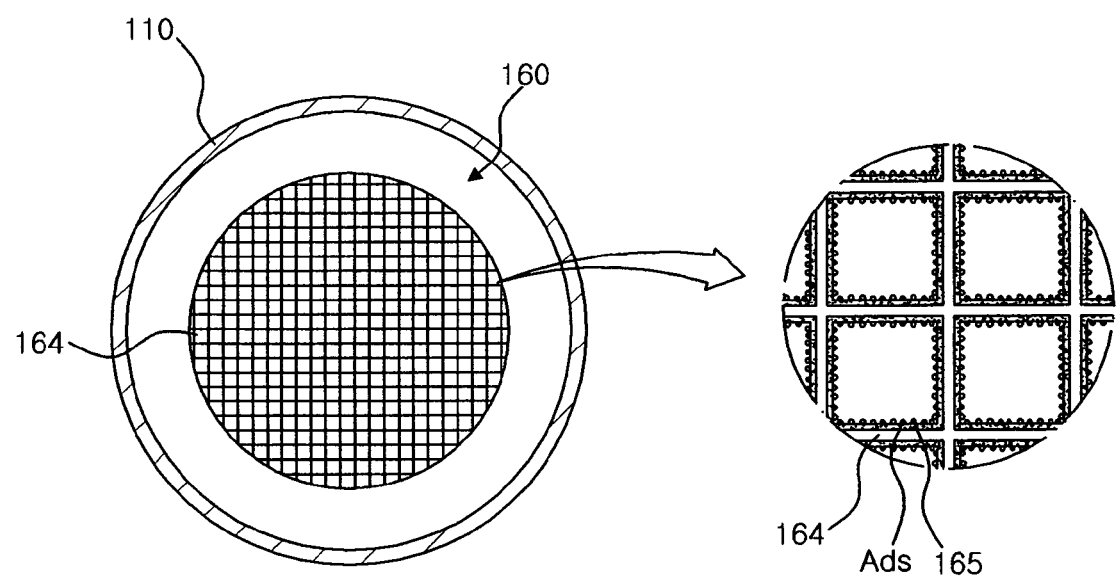
FIG. 6 is a sectional view taken along line III-III of FIG. 3 for explaining a third reactor of the exhaust gas purification system.

FIG. 3 is a sectional view of the purifier 100 shown in FIG. 2, FIG. 4 is a sectional view taken along line I-I of FIG. 3, FIG. 5 is a sectional view taken along line II-II of FIG. 3, and FIG. 6 is a sectional view taken along line III-III of FIG. 3.

As shown in FIG. 3, the purifier 100 according to an embodiment includes a stainless steel casing 110 in which the first, second and third reactors 120, 140 and 160 are installed. The casing 110 is configured in such a manner that its front and rear ends are connected to the exhaust pipe 2 to allow the exhaust gas flowing out of the diesel engine to be introduced through the upstream side thereof and the exhaust gas purified or processed in the first, second and third reactors 120, 140 and 160 to be discharged through the downstream side thereof.

Further, the reactors 120, 140 and 160 include carriers or structures 124, 144 and 164; ceramic supports 123, 143 and 163 installed at front and rear ends of the carrier or structures 124, 144 and 164 for supporting the carriers; and low temperature plasma units 122, 142 and 162; respectively. The carriers 124, 144 and 164 are supported in parallel with one another within the casing 110 by means of the ceramic supports 123, 143 and 163, respectively. Further, the low temperature plasma units 122, 142 and 162 are installed at both front and rear ends of the carriers 124, 144 and 164, respectively. The low temperature plasma units 122, 142 and 162 include rod-shaped ground electrodes 122a, 142a and 162a that are installed at both front and rear ends of the carriers 124, 144 and 164 and penetrate through the ceramic supports 123, 143 and 163; and mesh-type discharge electrodes 122b, 142b and 162b that cover the passages of the exhaust gas at the front and rear ends of the carriers 124, 144 and 164, respectively. The aforementioned ceramic supports 123, 143 and 163 perform a function of insulating the ground electrodes 122a, 142a and 162a, the discharge electrodes 122b, 142b and 162b, and the casing 110 from one another in addition to the function of supporting the carriers 124, 144 and 164, respectively.

Referring to FIGS. 3 and 4, the first reactor 120 includes the honeycomb ceramic carrier 124 with TiO2 photocatalyst 125 coated thereon. The photocatalyst 125 reacts with the low temperature plasma created in the low temperature plasma unit 122 to cause the photocatalytic reaction which in turn promotes the oxidation reaction for purifying or processing HC, CO and the like from the exhaust gas as described below.

Referring further to FIGS. 3 and 5, the second reactor 140 includes the SiC DPF carrier, i.e. the diesel particulate filter 144, with TiO2 photocatalyst 145 coated thereon. The diesel particulate filter 154 may include plugging 144a for plugging each of exhaust outlets adjacent to intake inlets for the exhaust gas thereof and a porous filter wall 144b placed between intake inlets and exhaust outlets for filtering out the particulate matters (PM) from the exhaust gas. Further, as will be explained later in detail, the photocatalyst 145 promotes the reaction with low temperature plasma created in the low temperature plasma unit 142 and thus the reaction of oxidizing particulate matters, i.e. PM, collected in the diesel particulate filter 144.

Alternatively, the aforementioned intake inlets and exhaust outlets of the diesel particulate filter 144 may be plugged alternately with the plugging 144a made of a conductive metal, and that surfaces of the plugging may be coated with conductive metal. If a high voltage is applied to the plugging 144a and thus the low temperature plasma is created, the collected particulate matters can be easily and effectively oxidized and removed.

Referring to FIGS. 3 and 6, the third reactor 160 includes a honeycomb shaped ceramic carrier 164 that is coated with a TiO2 photocatalyst 165 and an adsorber (Ads) made of potassium, barium and/or the like. The adsorber (Ads) adsorbs NOx, i.e. nitrogen oxides, for a certain period of time, and the photocatalyst 165 is activated with the low temperature plasma created in the low temperature plasma unit 162 to enhance reduction reactions which reduce NOx compounds. As the NOx compounds are reduced, the adsorber is regenerated. Further, the ceramic carrier 164 includes not only the photocatalyst 165 but also may include one or more cocatalysts containing rhodium (Rd), silver (Ag) and/or nickel (Ni) in order to increase the reducing power of the photocatalyst 165.

Figure 7:
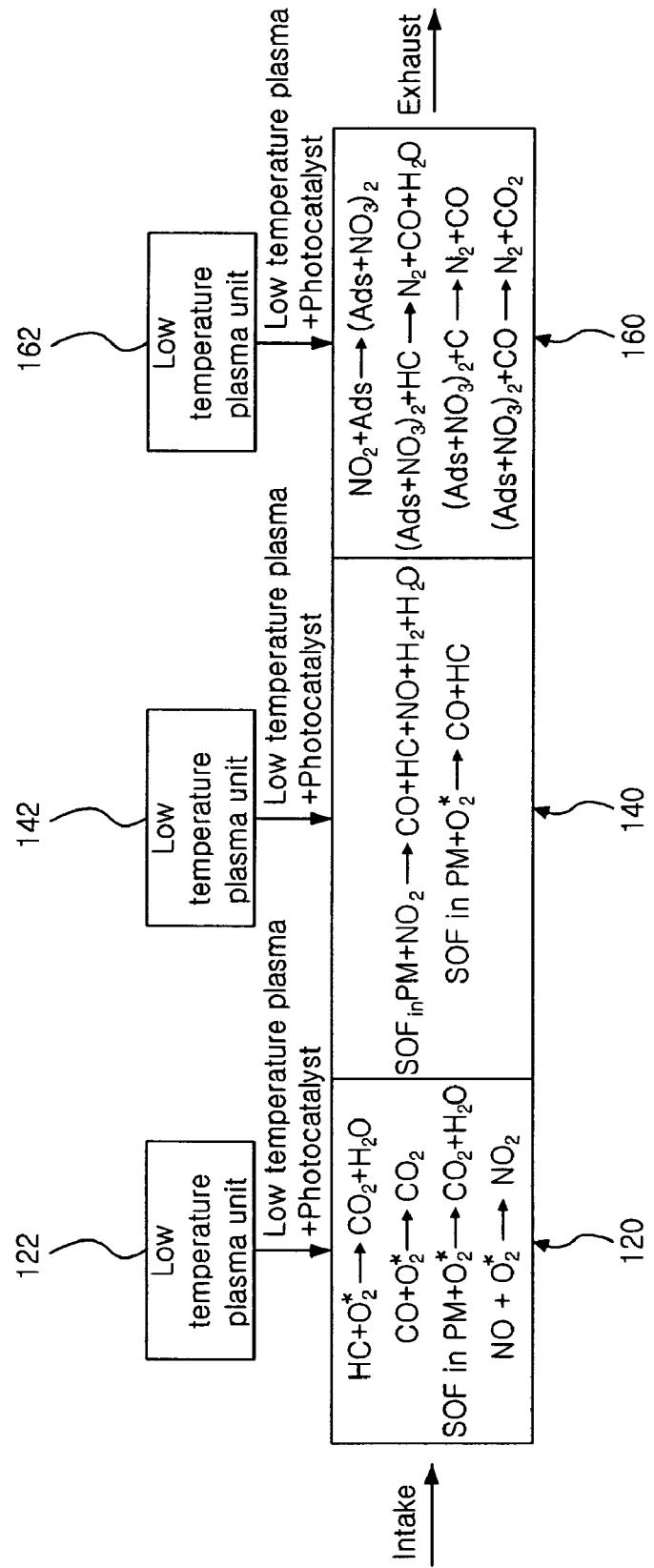
FIG. 7 is a diagram schematically illustrating a process of stepwise removing pollutants from the exhaust gas in respective reactors of the exhaust gas purification system shown in FIGS. 2 to 6.

FIG. 7 illustrates a process of stepwise treating the pollutants in the exhaust gas within the respective reactors 120, 140 and 160 by the exhaust gas purification or processing system according to an embodiment. The process of purifying or processing the exhaust gas of a diesel engine will be described with reference to FIGS. 2 to 7.

As shown in FIGS. 2 to 7, in the first reactor 120, the low temperature plasma unit 122 creates a low temperature plasma and generates a certain wavelength of light, such as ultra violet light onto the photocatalyst 125, and thus creates reactive oxygen and free radicals. The reactive oxygen causes HC, CO and NO in the exhaust gas and a part of soluble organic fractions (SOF) of the particulate matters (PM) to be oxidized. HC and CO are oxidized and turn to CO2 and water, SOF may also turn to CO2 and water. Further, NO among the NOx compounds is converted to NO2, which then can be used as an oxidizing agent for the oxidation of the particulate matters (PM) and in the second reactor.

The controller 200 may decrease the electric power applied to the low temperature plasma unit 122 to slow the oxidation reaction in the presence of the photocatalyst 125 under a lean burn condition where oxygen is rich in the exhaust gas. On the other hand, the controller may increase the electric power applied to the low temperature plasma unit 122 to facilitate the oxidation reaction in the presence of the photocatalyst 125 under a rich burn condition where there is a shortage of oxygen. Further, the controller 200 may control the amount of NO2, which is generated in the first reactor and used as an oxidizing agent in the second reactor 140 depending upon the composition of the exhaust gas.

In the second reactor 140, most of the particulate matters (PM) that are not fully oxidized in the first reactor 120 are collected on the diesel particulate filter 144. The collected particulate matters (PM) are then oxidized and converted to smaller molecules including CO, HC, H2, water, NO and the like. The NO2 existing in the exhaust gas and created in the first reactor 120 can be used as oxidizing agent of the particulate matters. Free radicals and reactive oxygen may also be used as oxidizing agent in the second reactor 140. By such oxidation reactions the diesel particulate filter 144 in the second reactor 140 can be continuously regenerated. Furthermore, since the TiO2 photocatalyst 145 is used as the redox catalyst for the regeneration of the diesel particulate filter 144, the diesel particulate filter 144 can be continuously regenerated even at a lower exhaust temperature. In addition, since the TiO2 photocatalyst 145 can be rapidly activated by applying light generated in a low temperature plasma, the time needed for regenerating the diesel particulate filter 144 can be greatly reduced.

The controller 200 may control the amount of electric power to be supplied to the low temperature plasma unit 142 in view of the concentration of the components such as HC, CO, PM, etc. in the exhaust gas. In particular, soluble organic fractions (SOF) in the particulate matters (PM) may be at least partially oxidized to carbon monoxide (CO), and smaller hydrocarbons (HC). The resulting partially oxidized components including carbon monoxide and hydrocarbons may be used as a reducing agent for NOx in the third reactor 160.

In the third reactor 160, NOx compounds in the exhaust gas passed through the first and second reactors 120 and 140 is adsorbed by the adsorber (Ads) and then temporarily kept in the honeycomb carrier 164 of the third reactor 160. Then, NOx compounds adsorbed in the adsorber (Ads) are reduced by a photocatalytic reduction reaction, in which HC, CO and C are used as a reducing agent. The adsorber (Ads) can be regenerated by the reduction reactions.

The controller 200 can control the reducing power of the reduction reactions by controlling the supply of electric power to the low temperature plasma unit 162. The reduction reaction of NOx can be performed without being greatly subjected to the influence of oxygen even under the lean burn condition where oxygen is rich in the exhaust gas, and consequently, it is not necessary to supply an additional reducing agent for the NOx reduction. Moreover, the controller 200 can prevent nitrogen in the exhaust gas from being oxidized and thus the nitrogen oxide from being additionally produced by properly controlling the low temperature plasma unit 162.

In a case where the aforementioned exhaust gas purification or processing system for a diesel engine is used to purify or process an exhaust gas of a diesel engine, the first reactor 120 can remove significant portion of carbon monoxide and unburned hydrocarbons at low-temperature and low-load conditions regardless of the exhaust temperature. Further, the diesel particulate filter 144 of the second reactor 140 can collect the particulate matters (PM), which are often created in an accelerating period of the diesel engine. Further, the second reactor 140 can also continuously oxidize the collected particulate matters (PM) and thus continuously regenerate the diesel particulate filter 144 by the application of an appropriate voltage to the low temperature plasma unit 142.

Furthermore, the third reactor 160 can adsorb NOx compounds which are created early in the accelerating period of the diesel engine, with the adsorber (Ads) and then effectively remove the adsorbed NOx compounds by reducing them with HC, C and CO as a reducing agent. Further, the production of HC, C and CO can be controlled easily by changing the electric power applied to the plasma units of the first and second reactors 120 and 140 which improve the NOx removal efficiency and energy consumption efficiency.

In addition, TiO2 that is used as the photocatalyst 125, 145 and 165 in at least one of the reactors 120, 140 and 160 is excellent in the anti-poisoning against sulfur to the extent that inherent photocatalytic performance can be maintained even when the concentration of sulfur components in the diesel fuel is 50 ppm or more. Thus, the reduction in performance due to the sulfur components in the diesel fuel can be prevented.

Although the foregoing embodiments used a photocatalyst in all the reactors 120, 140 and 160, the photocatalyst may not be used in all the reactors. Other embodiments may have a photocatalyst in at least one of the reactors. For example, a photocatalyst is provided in the third reactor, in which the adsorption and reduction of NOx are performed.

Furthermore, although it has not been illustrated in the accompanying drawings, the exhaust gas purification or processing system can have a feature of warning a system malfunction by making an alarm sound or light when there is something wrong in the electric power or current applied to the respective reactors.

According to embodiments, NOx compounds can be easily adsorbed by the adsorber and the adsorbed NOx compounds can be easily reduced and removed without additional supply of the fuel or reducing agent under various combustion conditions of the diesel engine, by controlling photocatalytic reactions. Further, there is little need for a periodic high-load condition to reduce or remove NOx. Therefore, there is an advantage in that the exhaust gas purification system and method of the present invention can be more preferably employed in the diesel car engine although it is not limited to diesel engines.

In addition, the present invention has solved the problems of the prior art in which additional fuel should be further injected to create an atmosphere where NOx can be reduced. Therefore, there is another advantage in that the fuel consumption can be greatly reduced.

Further, harmful materials such as HC, CO, PM and NOx can be purified or processed at a relatively low temperature. Since the time needed for activating the catalyst is not substantially required, the exhaust gas purification or processing efficiency can be enhanced.

Furthermore, the present invention can use the components of exhaust gas, such as HC, CO, C or NO2, oxidizing or reducing agents in the oxidation or reduction reactions. Therefore, the exhaust gas purification efficiency can be further improved and the waste of energy needed in purifying the exhaust gas can also be reduced.

In addition, in the foregoing embodiments where TiO2, which is excellent in anti-poisoning against sulfur components, is used as a photocatalyst, reduction in durability of the system due to the sulfur components can be prevented, and even diesel fuel containing the sulfur components greater than the conventional fuel can be used.

Various features and aspects of the present invention have been described with reference to the specific embodiment thereof. However, various variations, modifications and changes to the present invention can be made in the art within the scope of the invention defined by the appended claims. Therefore, it should be construed that the foregoing descriptions and accompanying drawings do not restrict but illustrate the technical scope of the present invention.

What is claimed is:

1. A method of processing a composition comprising soot particles and NOx, the method comprising:
    flowing a composition comprising soot particles and gaseous components through a conduit in a flow direction, the gaseous components comprising NOx compounds, which comprise NO and $NO_2$;
    filtering the soot particles with a filter located in the conduit while passing most of the gaseous components through the filter, the soot particles comprising hydrocarbons that may not pass through the filter;
    removing at least part of the filtered soot particles from the filter by an oxidation reaction of some or all of the hydrocarbons, which are broken into smaller molecules that can pass through the filter;
    adsorbing at least part of the NOx compounds with an adsorber located in the conduit past the filter in the flow direction; and
    converting at least part of the adsorbed NOx compounds to $N_2$ by a reduction reaction of NOx compounds in the presence of a photocatalyst, wherein the photocatalyst is activated by light created during a plasma discharge.

2. The method of claim 1, wherein at least part of the smaller molecules passing through the filter participates in the reduction reaction of NOx compounds as a reducing agent.

3. The method of claim 1, wherein the oxidation reaction is conducted in the presence of a redox catalyst.

4. The method of claim 1, wherein the photocatalyst is selected from the group consisting of $TiO_2$, ZnO, CdS, $ZrO_2$, $SnO_2$, $V_2O_2$, $WO_3$, $SrTiO_3$, and a mixture comprising one or more of the foregoing compounds.

5. The method of claim 1, wherein the photocatalyst is provided in the vicinity of the adsorber.

6. The method of claim 3, wherein the redox catalyst comprises a photocatalyst that can be activated by applying light thereto, and wherein the method further comprises applying light to the photocatalyst so as to activate the redox catalyst.

7. The method of claim 6, wherein applying light comprises providing creating a controllable plasma discharge in the vicinity of the photocatalyst.

8. The method of claim 1, wherein a degree of activation of the photocatalyst is controllable by intensity of the light applied thereto, and wherein the method further comprises controlling the intensity of the light, thereby controlling the degree of activation of the photocatalyst.

9. The method of claim 6, wherein the method further comprises increasing the intensity of the light applied to the photocatalyst for the oxidation reaction of hydrocarbons so as to supply more reducing agents for the reduction reaction of NOx compounds.

10. The method of claim 1, further comprising subjecting the composition to oxidation conditions in an area in the conduit before the filter in the flow direction, wherein at least part of components of the composition is oxidized in the oxidation conditions before reaching the filter.

11. The method of claim 10, wherein the oxidation conditions are provided by activating a photocatalytic redox catalyst provided in the area by applying light thereto, and wherein the method further comprises changing the intensity of the light, thereby controlling a degree of activation of the redox catalyst and controlling the oxidation of components of the composition while passing through the area.

12. The method of claim 11, wherein at least part of the oxidized components in the oxidation conditions participates in the oxidation reaction of hydrocarbons as an oxidizing agent, and wherein the method further comprises increasing the intensity of the light applied to the photocatalyst so as to supply more oxidizing agents for the oxidation reaction of hydrocarbons.

13. The method of claim 1, wherein the composition comprises an exhaust gas from combustion of fuel comprising hydrocarbons and wherein the oxidation and reduction reactions require no additional oxidizing agent or reducing agent other than the exhaust gas and air from the surrounding.

14. A method for purifying exhaust gas of an engine, the method comprising:
    oxidizing at least part of hydrocarbons, CO, NO and particulate matters contained in the exhaust gas by an oxidation reaction in the presence of a light-activated redox catalyst in a first reactor, wherein the light-activated redox catalyst is activated by light generated by a plasma discharge within the first reactor;
    collecting with a filter the particulate matters of the exhaust gas after the first reactor, and oxidizing at least part of the collected particulate matters by an oxidation reaction in the presence of a light-activated redox catalyst in a second reactor, wherein the light-activated redox catalyst is activated by light generated by a plasma discharge within the second reactor;
    adsorbing with an adsorber NOx contained in the exhaust gas after the second reactor and removing at least part of the adsorbed NOx by a reduction reaction in the presence of a light-activated redox catalyst in a third reactor, wherein the light-activated redox catalyst is activated by light generated by a plasma discharge within the third reactor; and
    controlling the activity of the light-activated redox catalysts in the first, second and third reactors by adjusting intensity of light generated by the plasma discharges in the first, second and third reactors.

15. The method of claim 14, wherein the method is used in connection with a diesel engine, wherein the method further comprises making a determination whether the diesel engine is operated either in a lean or rich burn condition, and wherein the activity of the light-activated redox catalysts is controlled based on such determination of the diesel engine's operation.

16. The method of claim 8, wherein the method is used in connection with a diesel engine, wherein the method further comprises making a determination whether the diesel engine is operated either in a lean or rich burn condition, wherein the degree of activation of the photocatalyst is controlled based on such determination.

* * * * *